United States Patent [19]

Bednar

[11] Patent Number: 4,736,924
[45] Date of Patent: Apr. 12, 1988

[54] FLEXIBLE INSTRUMENT ADAPTOR CUP

[76] Inventor: Charles J. Bednar, 715 Lake St., Oak Park, Ill. 60301

[21] Appl. No.: 890,628

[22] Filed: Jul. 30, 1986

[51] Int. Cl.⁴ ............................................. F16M 13/00
[52] U.S. Cl. ..................................... 248/558; 248/27.1
[58] Field of Search ...................... 248/558, 27.1, 27.3; 73/431; 33/348, 356

[56] References Cited

U.S. PATENT DOCUMENTS

| | | | |
|---|---|---|---|
| 3,594,911 | 7/1971 | Sherman et al. | 33/348 |
| 3,807,236 | 4/1974 | Leone | 73/431 |
| 3,871,606 | 3/1975 | Larson et al. | 248/27.1 |
| 3,885,441 | 5/1975 | Jones | 73/431 |
| 4,179,933 | 12/1979 | Price | 73/431 |
| 4,201,090 | 5/1980 | Davidson | 73/431 |
| 4,209,154 | 6/1980 | Hehl | 248/27.3 |
| 4,526,332 | 7/1985 | Bales | 248/27.1 |

Primary Examiner—Ramon O. Ramirez
Attorney, Agent, or Firm—Basil E. Demeur; Robert E. Knechtel

[57] ABSTRACT

An adaptor case for mounting instruments on a mounting surface. The adaptor case has a side wall support extending from a base plate. The side wall support receives and supports the front portion of the instrument. The base plate can be rotated for mounting the instrument in either an instrument protruding position in which the instrument extends outwardly from the mounting surface or an instrument recessed position in which the instrument is recessed inwardly of the mounting surface. A retainer bracket securely mounts the instrument to the mounting surface regardless of whether the adaptor is mounted in the instrument protruding or recessed position.

13 Claims, 2 Drawing Sheets

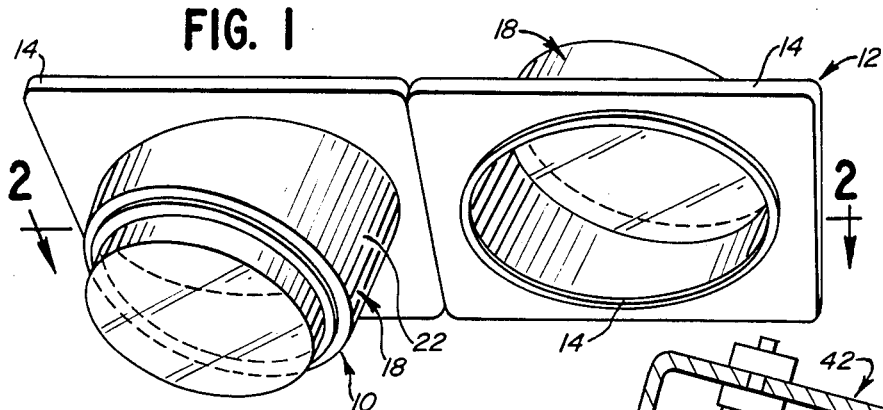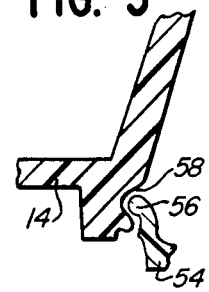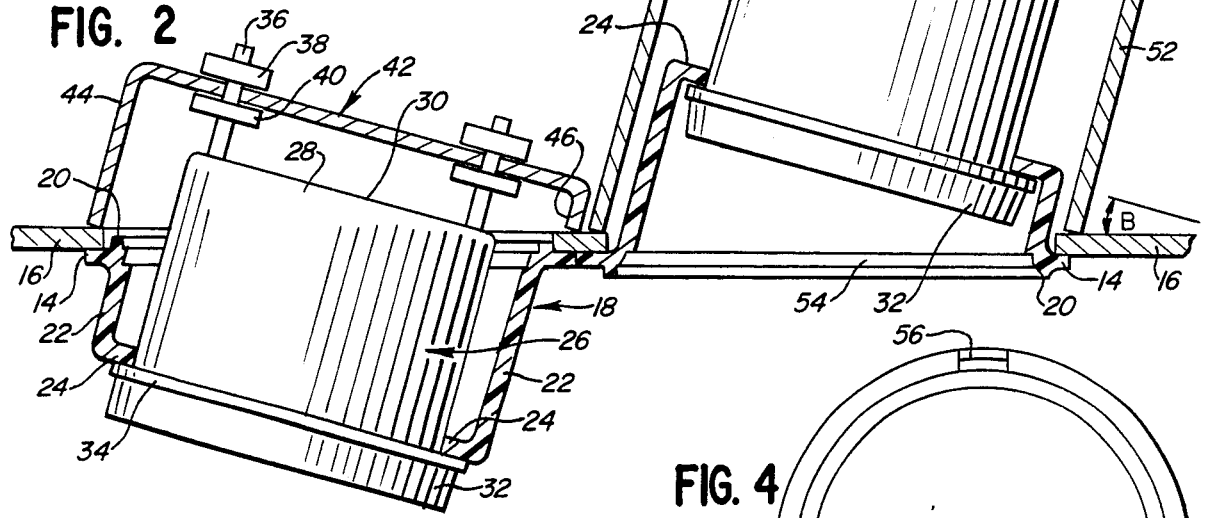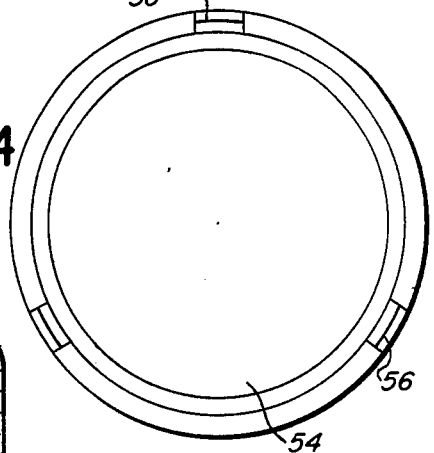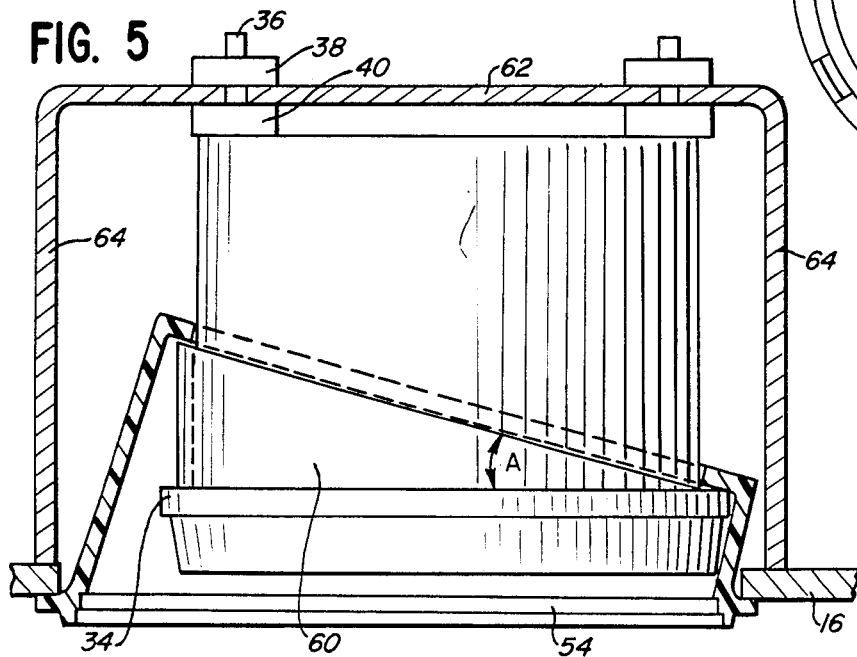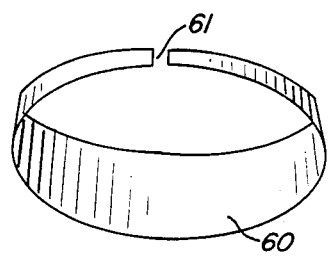

FLEXIBLE INSTRUMENT ADAPTOR CUP

BACKGROUND AND SUMMARY OF THE INVENTION

This invention relates to instrument adaptor cases and more particularly to an adaptor case to permit mounting an instrument on a mounting surface used in either an instrument protruding position or in a recessed position.

It is often desirable to mount visual instruments necessary for control of machines such as boats, automobiles or other vehicles, on a mounting surface at a flat or angle with respect to orienting these instruments for easy visibility during the operation of such machines. As within a reasonable focal point of an operator, as the number of instrument positions increase horizontally or vertically to the focal point of the operator's position, it is often desirable to mount the instruments from a flat position near the operator's centerline of sight to an angled position within the periphery areas of the focal point in order to improve the operator's visibility of the instruments. At times it is desirable that the adaptor case protrude or extend the instrument from the mounting surface in order to utilize the space at the back of the mounting surface for other purposes or to project the instrument face at a more suitable angle in the peripheral areas of visibility. At other times, it is desirable to mount the adaptor case so that the instrument is recessed within the mounting surface, or in closer proximity to the centerline of the operator's viewing angle. In other circumstances, it may be desirable to mount the adaptor case in combination with each other, as components in an arrangement of projecting or recessed instrument positions, in order to suitably orient these instruments in the most appropriate visibility position to the operator of the machine.

The manufacturer of standard instruments does not know in advance where his product will most suitably adapt to the visibility needs of a machine operator. In order to lower production costs and yet permit any of these described methods of mounting the instrument, it is evident that is is desirable to manufacture a standard model of flat and angled instrument cases capable of being mounted protruding and recessed from a common surface and so constructed that they are adaptable to be flexibly arranged in any of the described mountings to meet unforeseen visibility requiements.

In the past there has not been available an adaptor case suitable for mounting flat or angled instruments in both instrument protruding or recessed positions. The prior art discloses modifications to the instrument case or housing to permit instruments to be mounted in a particular fashion to the panel. For example, U.S. Pat. No. 3,594,911 illustrates an angled cap in which a compass is placed in order to permit the compass to present its face to the operator at a predetermined angle. U.S. Pat. No. 2,285,658 illustrates another example of an instrument cover adapted to be disposed at an adjustable angle with respect to the instrument dial. As can be seen from these patents, neither is adaptable for recessed or protruding instrument mounting.

OBJECTS AND ADVANTAGES

It is an object of the present invention to provide an adaptor case for mounting instruments to a mounting surface panel in either an instrument protruding position in which the instrument extends outwardly from the panel, or an instrument recessed position in which the instrument is recessed inwardly of the panel and an adaptor case which can mount the instrument in either of the described positions and further mount the instrument at a suitable angle of between 5° and 20° of visibility to the operator within the mounting surface.

Yet another object is to provide an adaptor case for mounting instruments which will mount the instrument in either an instrument protruding position or an instrument recessed position in which the instrument is mounted perpendicular to the mounting surface.

Yet another object is to provide one adaptor case which is capable of mounting the instrument in either the protruding or recessed positions by merely rotating the adaptor 180°.

Still another object is to provide an adaptor case capable of firmly mounting the instrument with respect to the mounting surface so that the instrument is securely mounted to the mounting surface by means of the adaptor which is held in position by a retainer bracket.

Another object is to provide an adaptor case of the type described which further includes an integrally formed lip along the exterior surface which functions to locate the instrument hole or cut-out in the panel when mounted in the positive or protruding mounting configuration, and wherein the adaptor sidewall functions to locate the mounting surface hole or cut-out in the negative or recessing mounting configuration.

This invention overcomes the prior art problems by providing one adaptor case which is suitable for mounting in either of two positions on a panel. One of the positions permits the adaptor case is rotated, the instrument is mounted in a recessed position. The instrument is supported by sidewalls mounted on a base plate of the adaptor case with the side walls supporting the instrument. The end of the side wall opposite the base plate can be truncated at an angle which permits the instrument to thus be mounted at an angle with respect to the mounting surface. By the addition of a shim, the instrument can be mounted perpendicular to the mounting surface or, in an alternate embodiment, the supporting side walls are of uniform height which in turn causes the instrument to be mounted perpendicular to the mounting surface.

A retainer bracket attaches to the rear of the instrument. The retainer bracket has legs which contact the backside of the instrument mounting surface, and by tightening the retainer bracket, the instrument is firmly held between the retainer bracket and the adaptor case.

BRIEF DESCRIPTION OF THE DRAWINGS

The above objects and advantages will become apparent when viewed in conjunction with the drawings in which:

FIG. 1 is a perspective view of two adaptor cases adjacent each other with one of the adaptor cases positioned for mounting an instrument in a protruding position and the other positioned for mounting an instrument in a recessed position.

FIG. 2 is a cross-sectional side view taken along line 2—2 of FIG. 1 and further indicating instruments mounted in both the protruding and recessed position.

FIG. 3 is an enlarged cross-sectional view with portions removed of the end of the cylindrical wall on the adaptor case adapted to receive a protective lens covering.

FIG. 4 is a front view of a protective lens cap used to cover an instrument when the instrument is mounted in the recessed position.

FIG. 5 is a cross-sectional view with portions removed of an instrument mounted in the recessed position wherein a shim is used to mount the instrument within the adaptor case perpendicular to the mounting surface.

FIG. 6 is a perspective view of a shim used to mount the instrument illustrated in FIG. 5 in the perpendicular position.

DESCRIPTION OF THE PREFERRED EMBODIMENT

Figure 7:
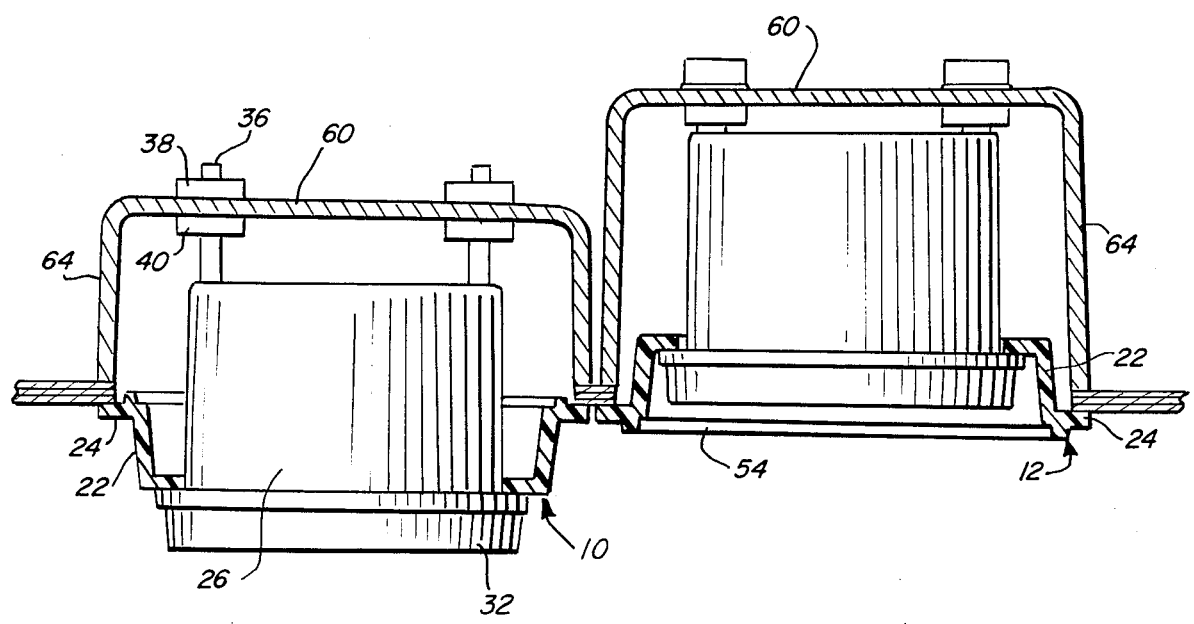
FIG. 7 is another embodiment of a mounting bracket shown in cross-section with portions removed which mounts an instrument perpendicular to the mounting surface without the need of a shim.

Turning first to FIG. 1, there is illustrated a first adaptor cup 10 shown in the positive mounting position. The positive mounting position is defined as the position in which an instrument is mounted so that it protrudes out from a mounting surface in the direction of the observer. There is also illustrated a second adaptor cup 12 oriented in an instrument recessed position in which the instrument is recessed inwardly of the mounting surface. Except for their orientation, adaptor cases 10 and 12 are identical and when possible similar numbers and identification of the parts will be used herein.

The adaptor case 10 or 12 has a base 14 which is substantially flat and adapted to be mounted against a mounting surface 16 (FIG. 2). Extending from the base 14 is a truncated, side wall support 18 comprised of a lip 20, annular wall 22, and shoulder 24. It has been determined that a reasonable arc of visibility shall not be less than 5° or more than 25°, thus establishing a mean angle of 15° for a fixed angle position. Hence the angle of truncation as above in FIG. 2 is approximately 15°.

In the protruding position, as seen in FIG. 2, the truncated side wall support 18 has the base 14 placed against the front side of the mounting panel 16, i.e., the side exposed to the operator. The lip 20 locates the base 14 to the through hole opening of the mounting surface 16. An instrument 26 is placed through an opening at the end of the truncated support 18 opposite the base 14. The instrument 26 has an instrument housing or casing 28 with a back 30 and cover 32. There is a sealing ring or shoulder 34 on the instrument cover 32 which acts as a support against the shoulder 24. This positions the instrument 26 against the shoulder 24 and is normally dimensioned to snugly receive the instrument 26.

The back of the instrument 30 normally has a pair of threaded terminal plugs 36 which are secured to the instrument 26. A pair of nuts 38, 40 are placed on either side of a retainer bracket 42. In this manner the retainer bracket 42 can be secured to the threaded terminal plugs 36. The retainer bracket 42 has a pair of legs 44, 46 which are dimensioned to contact the back side of the mounting surface 16 by tightening the screws 38, 40. The retainer bracket 42 thus can clamp the instrument 26 against the shoulder 24 on one side of the mounting surface 16 with the retainer bracket 42 applying a uniformally constant force across the back 30 of the instrument and against the back side of the mounting surface 16. In this manner, the instrument 26 is secured to the mounting surface 16 by means of the adaptor case 10.

Also illustrated in FIG. 2 is the adaptor case 12 illustrated in the recessed mounting position. It can be seen that the instrument 26 is recessed with respect to the mounting surface 16 so that no portion of the instrument cover 32 extends past the front plane of the mounting surface 16. The adaptor case 10 is easily adapted to assume the position shown by adaptor case 12 by merely rotating the adaptor case 180° so that the shoulder 24 is now on the side of the mounting surface 16 opposite the side of the operator. The sidewall 18 of the base 14 locates the wall 22 to the through hole opening of the mounting surface 16. The base 14 still contacts the side of the mounting surface exposed to the operator, but the opposite side of the shoulder 24 now contacts the sealing ring 34 of the instrument cover 32. A different retainer bracket 38 having longer legs 50, 52 is used to accommodate the additional depth of the instrument 26 behind the mounting surface 16 which is required so that the instrument 26 is completely recessed. However, the concept is the same in that the retainer bracket 48 is secured by means of nuts 38, 40 mounted on threaded terminal plugs 36 such that the retainer bracket 48 is securely fastened to the instrument 26. The instrument cover 32 and sealing ring 34 are secured against the shoulder 24 while the screws 38, 40 are tightened. In this manner, the instrument 26 is secured in the recessed position to the mounting surface 16 by means of the adaptor 12.

There is additionally provided a protective lens cap or cover 54 which protects the instrument cover 32 from debris or other objects which may fall upon the instrument when in the recessed mounting position. As seen in FIG. 3, the lens cap 54 has tangs 56 molded into the lens cap. These tangs 56 are received in an annular groove 58 molded into the base 14.

At times it may be desirable to have the instrument 26 mounted perpendicular to the mounting surface 16. This will occur when the operator is directly above or in front of the instrument panel and it would be undesirable to have the instrument mounted at an angle with respect to the panel 16. As illustrated in FIG. 5, the adaptor case 12 can be adapted to accomplish this purpose. Particularly, a shim collar 60 is placed around the instrument housing 28 and has one end butted up against the sealing ring or shoulder 34. The other side of the shim collar 60 is in contact with the shoulder 24. As seen in FIG. 6, the shim collar 60 has a gap 61 which permits the shim collar to expand so that it can be slipped around the instrument housing 28. Preferably the shim collar 60 is manufactured from a flexible plastic material to permit it to expand without breaking.

A retainer bracket 60 which is similar to the retainer bracket 42 except having equal legs 64 is mounted to the instrument back 30 by means of threaded terminal plugs 36 and screws 38, 40. The equal legs 64 are required in order to apply a uniform pressure across the instrument back 30 which is now substantially parallel to the mounting surface 16. The angle of the shim collar indicated as angle "A" in FIG. 5 is identical to an angle "B" in FIG. 2 which is the angle of truncation of the annular wall 22.

In the alternate embodiment shown in FIG. 7, the annular wall 22 of the adaptor case 10 or 12 is of uniform height throughout, and the annular wall is not cut at an angle of truncation as the adaptor illustrated in FIG. 1. A retainer bracket 60, which is substantially similar to the retainer bracket 60 illustrated in FIG. 5, and which has equal legs 64, allows the instrument 26 to be mounted substantially perpendicular to the mounting panel 16. This achieves the same result as utilizing the shim collar 60 with the truncated side wall support 18 as shown in FIG. 5 without the need for using a shim collar 60. The annular wall 22 has a uniform height throughout which allows the instruments to be mounted perpendicular to the mounting surface 16 in either the instrument protruding position or the recessed position.

Thus it is apparent that there has been provided, in accordance with the invention, an adaptor for mounting instruments in either the instrument protruding or recessed position that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An adaptor case for mounting instruments on a panel, wherein the instruments have a front and a rear and the mounting surface has a front and back side and further has an opening therein to receive the instrument, the adaptor comprising;
   a base plate adapted for mounting on the panel, the base plate further adapted for orientation in either an instrument protruding position in which the instrument extends outwardly from the panel, or an instrument recessed position in which the instrument is recessed inwardly of the panel;
   a side wall supporting means extending from the base plate for receiving and supporting the front of the instrument, the side wall supporting means extending in either the instrument protruding position or instrument recessed position depending upon the orientation of the base plate;
   said base plate and side walls supporting means being integral and of unitary construction; and
   a retainer bracket adapted for receiving in locking relationship the rear of the instrument so that the instrument is firmly retained between the side wall supporting means and the retainer bracket regardless of whether the base plate is mounted in the instrument protruding or recessed position.

2. The adaptor of claim 1 wherein the side wall supporting means comprises a cylindrical wall having opposite ends, one end affixed to and extending from the base plate and the other end adapted to receive an annular protrusion on the front of the instrument whereby the front of the instrument rests against the other end.

3. The adaptor of claim 1 and further comprising tightening means for causing the retainer bracket to firmly retain the instrument between the side wall supporting means and the retainer bracket.

4. The adaptor of claim 3 wherein the retainer bracket is firmly tightened against the back side of the panel and the base plate is firmly pressed against the front side of the panel.

5. The adaptor of claim 2 wherein the other end of the cylindrical wall is truncated at an angle of truncation causing the instrument to be mounted with respect to the panel at the angle of truncation.

6. The adaptor of claim 5 wherein the angle of truncation is between 5° and 25° with respect to the panel.

7. The adaptor of claim 5 wherein the mounting bracket has feet which engage the back side of the panel, the feet being of unequal length to apply uniform pressure across the rear of the instrument by compensating for the truncation of the cylindrical wall.

8. The adaptor of claim 2 wherein the cylindrical wall is of uniform height causing the instrument to be mounted perpendicular to the panel.

9. The adaptor of claim 8 wherein the mounting bracket has feet which engage the back side of the panel, the feet being of equal length to provide uniform tightening pressure across the front and the rear of the instrument.

10. The adaptor of claim 5 and further comprising a shim mounted between the front of the instrument and the other end of the cylindrical wall, the shim configured as a truncated cylinder having an angle of truncation equal to the angle of truncation of the cylindrical wall to compensate for the cylindrical wall truncation and cause the instrument to be mounted perpendicular to the panel.

11. The adaptor of claim 1 and further comprising a protective lens cap adapted to be received by the base plate when the base plate is mounted in the instrument recessed position.

12. The adaptor of claim 1 wherein the instrument protruding position or instrument recessed position is selected by turning over the base plate.

13. The adaptor of claim 12 wherein the base plate has a front and back base plate surface, with either surface adapted to be secured against the front side of the panel regardless of whether the base plate is mounted in the instrument protruding or instrument recessed position.

* * * * *